US009003656B2

(12) United States Patent
Floter et al.

(10) Patent No.: US 9,003,656 B2
(45) Date of Patent: Apr. 14, 2015

(54) SECURING DEVICE FOR SECURING A TURBOMACHINE ROTOR SET UP TRANSVERSELY TO A HORIZONTAL PLANE AGAINST TIPPING OVER AND ORIENTATION METHOD THEREFOR

(75) Inventors: Johann Floter, Kerken (DE); Armin Hülfenhaus, Langenfeld (DE); Claus Vögelin, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 1095 days.

(21) Appl. No.: 12/596,215

(22) PCT Filed: Apr. 3, 2008

(86) PCT No.: PCT/EP2008/053992

§ 371 (c)(1),
(2), (4) Date: Oct. 16, 2009

(87) PCT Pub. No.: WO2008/125506

PCT Pub. Date: Oct. 23, 2008

(65) Prior Publication Data

US 2010/0139064 A1 Jun. 10, 2010

(30) Foreign Application Priority Data

Apr. 16, 2007 (EP) .................................... 07007681

(51) Int. Cl.

| | |
|---|---|
| ***B23P 15/04*** | (2006.01) |
| ***F04D 29/64*** | (2006.01) |
| ***F01D 25/28*** | (2006.01) |
| ***F04D 29/28*** | (2006.01) |

(52) U.S. Cl.

CPC .............. *F04D 29/644* (2013.01); *F01D 25/28* (2013.01); *F04D 29/284* (2013.01); *F05D 2240/90* (2013.01); *F05D 2230/70* (2013.01); *F05D 2240/20* (2013.01); *F05D 2230/60* (2013.01)

(58) Field of Classification Search

CPC ........................................................ B65G 7/08
USPC ............ 29/889.21, 889, 889.2; 148/539, 639; 228/231; 414/754; 269/61; 416/191, 416/213 R

See application file for complete search history.

(56) References Cited

U.S. PATENT DOCUMENTS 2,930,492 A * 3/1960 Metcalf ........................ 414/754

FOREIGN PATENT DOCUMENTS

| | | | |
|---|---|---|---|
| DE | 2325642 | A1 | 12/1973 |
| DE | 2426231 | A1 | 5/1974 |
| JP | 5072734 | | 6/1975 |
| JP | 60044267 | A | 3/1985 |
| JP | 08082117 | A | 3/1996 |
| WO | WO 00/17492 | A1 | 3/2000 |

* cited by examiner

*Primary Examiner* — Richard Chang

(57) ABSTRACT

A securing device for securing a rotor of a turbomachine against tilting is provided, the rotor being arranged perpendicular in relation to a horizontal plane. The securing device includes a support surface enabling the rotor to be laterally supported in relation to the securing device. The rotor or the tie rod, arranged in an essentially vertical manner, are oriented vertically such that during an alignment, the support surface on which the rotor or the tie rod support, are displaced such that rotor is perpendicular in relation to the horizontal plane.

18 Claims, 4 Drawing Sheets

SECURING DEVICE FOR SECURING A TURBOMACHINE ROTOR SET UP TRANSVERSELY TO A HORIZONTAL PLANE AGAINST TIPPING OVER AND ORIENTATION METHOD THEREFOR

CROSS REFERENCE TO RELATED APPLICATIONS

This application is the US National Stage of International Application No. PCT/EP2008/053992 filed Apr. 3, 2008, and claims the benefit thereof. The International Application claims the benefits of European Patent Application No. 07007681.5 EP filed Apr. 16, 2007. All of the applications are incorporated by reference herein in their entirety.

FIELD OF INVENTION

The invention relates to a securing device for securing a turbomachine rotor set up transversely to a horizontal plane against tipping over, with at least one supporting surface, by which a rotor set up transversely to the horizontal plane can be supported laterally by the securing device. The invention relates, furthermore, to a method for the vertical orientation of a turbomachine rotor to be set up perpendicularly to the horizontal plane.

BACKGROUND OF INVENTION

Gas turbines and their structural set-up are generally known. The rotors of gas turbines may in this case be constructed and assembled in various ways. One rotor variant comprises a multiplicity of elements which lie one against the other and are braced via a tie rod extending centrally through the elements. These elements are, on the one hand, rotor disks and, on the other hand, tubular sections, what are known as hollow shafts, which can bear against the rotor disks. The bracing of the rotor disks and hollow shafts is carried out in each case by means of screw nuts screwed on the tie rod on the end faces, the screw nut provided on the compressor side often being designed as a hollow shaft. The rotor disks, bearing one against the other over their area on the end faces, as a rule, carry the moving blades of the turbine and of the compressor on their outer circumferences. Instead of one central tie rod, it is also known to use a plurality of eccentric tie rods.

In order to assemble and dismantle a multipart rotor of this type, an assembly tool is known which comprises essentially two bearing blocks. The two bearing blocks are set up, spaced apart from one another, and the rotor is deposited on them. One of the two bearing blocks, what is known as the turning block, is in this case equipped with a joint which is arranged between the foot and the bearing surface and which is fastened to one end of the rotor. The rotor is therefore placed such that, for example, its compressor-side end can be fastened directly to the joint of the turning block. The other bearing block then supports the rotor on the turbine side. The joint fastened to the turning block serves for transferring the rotor out of the horizontal position into a position perpendicular thereto. For this purpose, a suspension nut is screwed onto the tie rod at the turbine-side end of the rotor. A cable of a crane is fastened to the suspension nut by means of a shackle. While the crane is raising the turbine-side end of the rotor, the compressor-side end rotates about the center of rotation of the joint. The raising operation is concluded when the rotor has reached an approximately vertical position. It is then secured against tipping over by means of a securing device which is also provided on the turning block. As a rule, this securing device comprises a blocking bolt which is provided, above the joint, on the turning block and which blocks the backward movement of the rotor out of the vertical. The suspension nut is subsequently demounted, after which the actual work on the vertically set-up rotor (or tie rod) can then take place.

For assembling the rotor, first the tie rod is set up vertically, and then the individual rotor disks are slipped onto the tie rod in succession, from above, by means of a crane. A turbine-side rotor nut is subsequently screwed on. In the dismantling of a fully assembled rotor, after the latter has been set up vertically, the turbine-side rotor nut is removed, after which the individual rotor disks can be extracted from the tie rod with the aid of a crane. The rotor then comprises essentially only the tie rod.

A similar setting-up device with a turning block is known from German laid-open publication 24 26 231. A first stop is fastened to the foundation centrally below the turning block. In contrast to the abovementioned device, it is not the end of the rotor which is fastened to the turning block, but, instead, a rotor point spaced apart from the end. When the longer rotor section is being raised, the shorter rotor section then pivots toward the foundation. The coupling flange arranged on the shorter rotor section bears against the first stop after the rotor has been set up vertically, after which a second stop is then adapted on the other side of the flange and is connected fixedly via screws to the first stop in order to secure the rotor against tipping over.

SUMMARY OF INVENTION

An object of the present invention is to provide a securing device for securing a turbomachine rotor or tie rod set up transversely to a horizontal plane, in which the rotor or tie rod can be oriented into the vertical especially simply. A further object is to specify a corresponding method for this purpose.

The first-mentioned object is achieved by a securing device and the object directed at the method is achieved by a method as claimed in the independent claims.

The invention proceeds from the recognition that an especially simple orientation of the rotor or tie rod set up approximately perpendicularly to the horizontal plane into the vertical can be achieved when the at least one supporting surface of the securing device against which the rotor already bears during the orientation according to the invention is at least slightly displaceable. Particularly when the rotor is finally to be oriented into the vertical, the forces acting from the rotor upon the securing device transversely to the normal force are comparatively low, and therefore the securing device can have a correspondingly adapted dimensioning. Furthermore, the vertically standing rotor makes it possible to slip rotor disks onto and off the tie rod especially simply, without these touching the tie rod on account of a skew of the latter during raising or lowering.

In so far as the supporting surface against which the rotor comes to bear can be displaced in a plane approximately parallel to the horizontal plane, the already approximately vertically standing rotor can be oriented such that only balance forces have to be absorbed by the securing device. The securing device then has to absorb no weight force or only very low weight forces of the rotor. Expediently, the securing device is part of a modular assembly apparatus which, in addition to the securing device preferably designed as scaffold, comprises a separately formed turning block. The method according to the invention can then be carried out in a time-saving way by means of a device according to the invention so as to achieve the abovementioned advantages.

Advantageous refinements are specified in the dependent claims.

In a preferred refinement, the supporting surface is arranged on a ring composed of at least two ring segments. The supporting surface may in this case come to bear against part of the surface area of the rotor, in particular against the surface area of a hollow shaft or of a rotor disk. The supporting surface is preferably the inner cylindrical surface of the ring, and in this case the ring fastened to the rotor may also be provided as mechanical protection. Either the ring may be fastened to the still horizontal rotor, i.e. before the rotor is set up vertically. Or the ring is already premounted in the scaffold-like securing device and is opened to an extent such that the rotor section which is to be inserted into the ring can be introduced.

In order to fasten the rotor in a securing device particularly simply and quickly, one of the two ring segments is fastened so as to be pivotable with respect to the other ring segment. An especially simple mounting of the ring on the rotor can thereby take place, irrespective of whether the ring is premounted on the horizontal rotor or whether the ring is previously fastened to the securing device.

In order to displace the supporting surfaces, a plurality of screw connections or a plurality of hydraulic cylinders are provided, which in each case extend parallel or virtually parallel to the horizontal plane and which have elements, such as screws or hydraulic pistons, which are movable parallel or virtually parallel to the horizontal plane. In this case, at least three screw connections or hydraulic cylinders are provided, in order to displace the approximately perpendicularly set-up rotor in such a way that it can be brought out of an approximately perpendicular position into the vertical. Preferably, however, more than three, in particular preferably eight or nine screw connections or hydraulic cylinders are provided, in order to ensure a particularly reliable lateral support and particularly exact orientation. This is necessary especially for rotors of heavy gas turbines used for commercial current generation, since their rotor weight may amount to several tens of thousands of kilograms.

The screw connections or hydraulic cylinders of the securing device are in this case arranged in a radiating manner about a virtual center. Furthermore, the securing device and the turning block must be oriented with respect to one another and fastened on a foundation in such a way that, vertically, the projection of the virtual center coincides with a central rotor support point on the turning block. The central rotor support point is in this case the point which lies on the axis of rotation of the joint and at which the center of gravity of the rotor is to be placed. Particularly as a result of this, the vertical orientation of the rotor can be carried out comparatively quickly at comparatively low outlay.

Instead of a plurality of screw connections or a plurality of hydraulic cylinders, in an alternative refinement of the securing device at least one eccentric disk may be provided in which the supporting surface is arranged. So that the approximately perpendicularly set-up rotor can be balanced into any desired position with respect to the rotor support point of the turning block by means of the supporting surface, two eccentric disks nested one in the other are preferably provided, of which the inner eccentric disk has the supporting surface. As a result of this, too, an especially simple orientation of the approximately perpendicularly set-up rotor into the vertical is possible.

In an advantageous refinement of the securing device, the latter has above the foundation a platform or work stage jacked up on a plurality of stays and struts. The platform may serve, for example, as a work platform for fitters who are carrying out the orientation of the rotor into the vertical. Then especially, it is advantageous if the supporting surface is provided at the height of the platform, for example in the bottom of the latter. The one or more supporting surfaces can then be connected to the platform via the screw connections or hydraulic cylinders. Preferably, the distance between the joint of the turning block and the supporting surface arranged above it amounts to approximately 2-3 m.

BRIEF DESCRIPTION OF THE DRAWINGS

The invention is explained by means of a drawing in which, diagrammatically and not true to scale.

Identical components are given the same reference symbols in the figures.

DETAILED DESCRIPTION OF INVENTION

Figure 1:
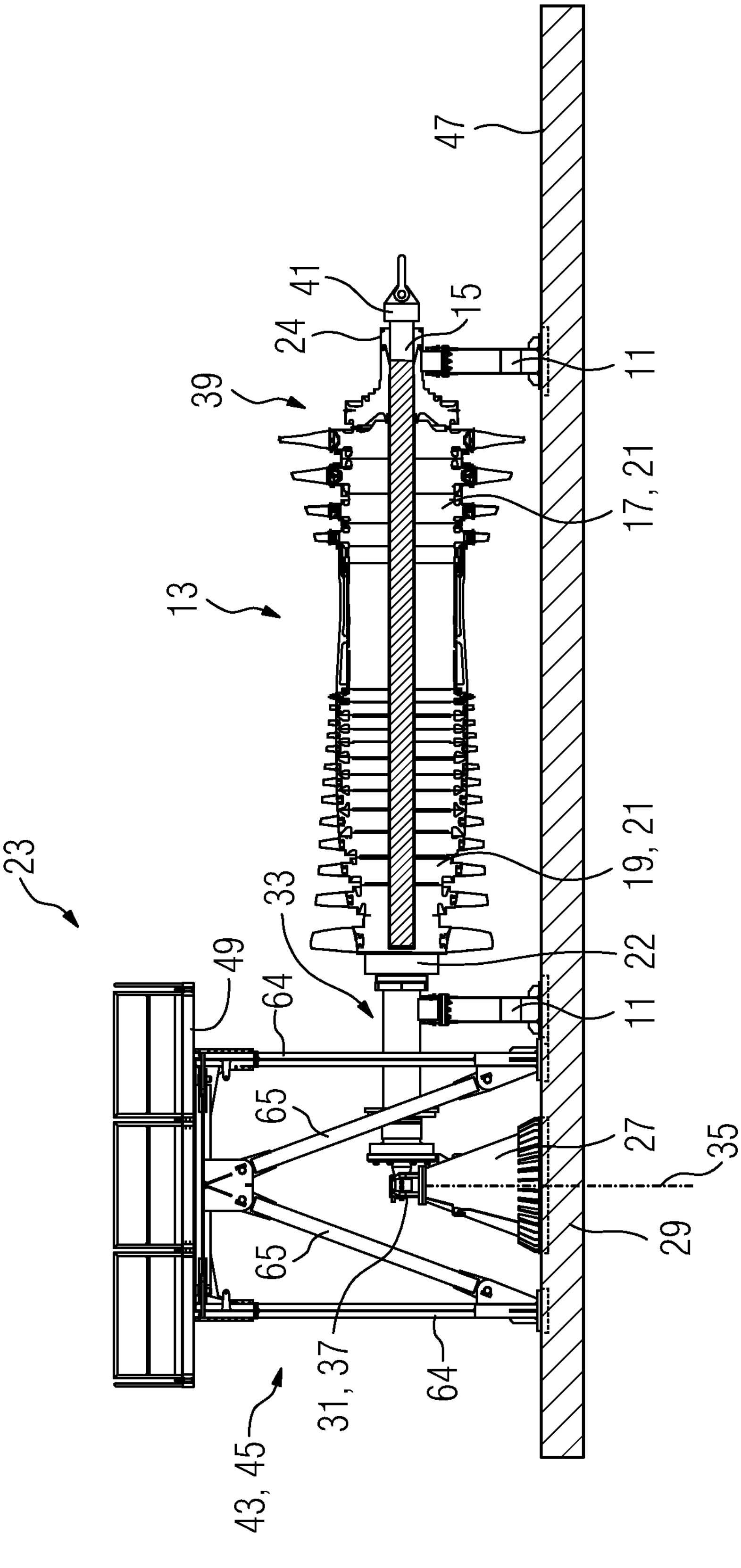
FIG. 1 shows the assembly apparatus for assembling and dismantling a rotor, with the rotor arranged (horizontally) parallel to the horizontal plane.

FIG. 1 illustrates a rotor 13, deposited on two bearing blocks 11, of a heavy stationary gas turbine. The rotor 13 comprises a tie rod 15 which extends centrally through a multiplicity of turbine disks 17 and compressor disks 19. In the example illustrated, the compressor-side end of the rotor 13 is illustrated on the left. The turbine disks 17 and compressor disks 90 are rotor disks 21 and at their outer ends carry moving blades which can be exposed to a compressible flow medium of the gas turbine.

For bracing the rotor disks 21, a front hollow shaft 22 is screwed onto the tie rod 15 at the compressor-side end 33 of the rotor 13. A screw nut 24 is provided on the turbine side.

In order to dismantle the modular rotor 13 of the gas turbine into its individual parts or in order to slip rotor disks 19, 21 onto a tie rod 15, an assembly apparatus 23, which is arranged at the rotor end, is provided in addition to the two bearing blocks 11. The assembly apparatus 23 comprises a turning block 27 which is fastened on a foundation 29. The turning block 27 is set up in alignment with the two bearing blocks 11 and in this case has at its tip a joint 31 which is connected to the compressor-side end 33 of the rotor 13. The rotor 13 is in this case rotatable about an axis of rotation, parallel to the horizontal plane 47, of the joint 31. Furthermore, the joint 31 comprises a rolling-bearing-mounted receptacle for a turntable 37 rotatable about a vertical axis 35. Moreover, the rotor support point is located on the vertical axis 35. At the turbine-side end 39 of the rotor 13, a suspension nut 41 is mounted, to which the cable of a crane can be fastened by means of a shackle.

The assembly apparatus 23 comprises, furthermore, a securing device 45 which is designed as a scaffold 43 and which is anchored separately from the turning block 27 in the foundation 29.

The scaffold 43 comprises a platform 49 or work stage jacked up on four vertical stays 64. For stiffening the scaffold 43, further struts 65 extending transversely with respect to the stays 64 are provided at each side edge of the scaffold 43 and additionally connect the foundation-side ends of the stays 64 to the platform 49.

So that the rotor 13 can be pivoted into the scaffold 43 and into the securing device 45, part of the platform 49 and the struts 65 arranged below it can be moved out of the pivoting range of the rotor 13. The platform 49 and the securing device 45 then have an opened receptacle (cf. FIG. 3).

By the turbine-side end 39 of the rotor 13 being raised by means of the crane, the rotor 13 is lifted out of the two bearing blocks 11, the compressor-side end of the rotor 13 rotating about the axis of rotation of the joint 31. With the receptacle open, the rotor 13 can then be turned out of its horizontal position (FIG. 1) into the vertical position (FIG. 2), after which it is secured against tipping over by means of the securing device 45. The receptacle is closed for this purpose. The rotor 13 is subsequently in the position illustrated in FIG. 2.

The entire weight force of the rotor 13, which is comparatively heavy in stationary gas turbines, then acts upon the turning block 27, whereas the scaffold 43 can prevent the rotor 13 from tipping over by means of comparatively low forces. The least force is necessary when the rotor 13 is oriented vertically and the axis of symmetry 46 of the rotor 13 coincides with the axis 35 of the turntable 37.

On account of the comparatively long distance between the joint 31 and the lateral support of the rotor 13 at the height of the platform 49, an especially reliable and, moreover, also earthquake-proof lateral support of the rotor 13 can be afforded. Earthquake-proof means in this context that the acceleration forces upon the rotor 13, of the order of magnitude of approximately ½ g (1 g=simple gravitational acceleration), which occur with comparatively low intensity during comparatively weak earthquakes can be absorbed by the securing device 45 and be diverted into the foundation 29 via the platform 49 and the struts 65.

Figure 2:
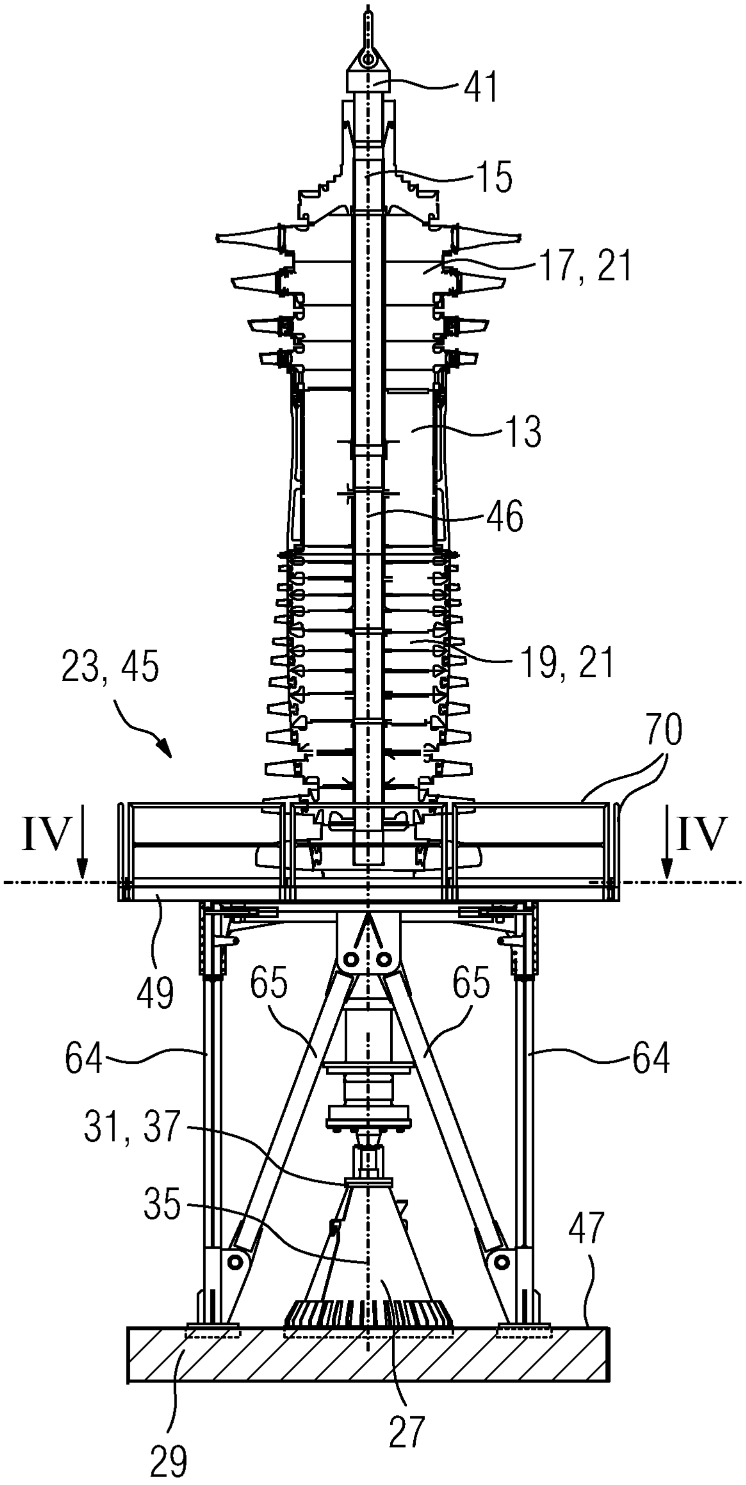
FIG. 2 shows the assembly apparatus according to FIG. 1, with the rotor set up vertically.
Figure 3:
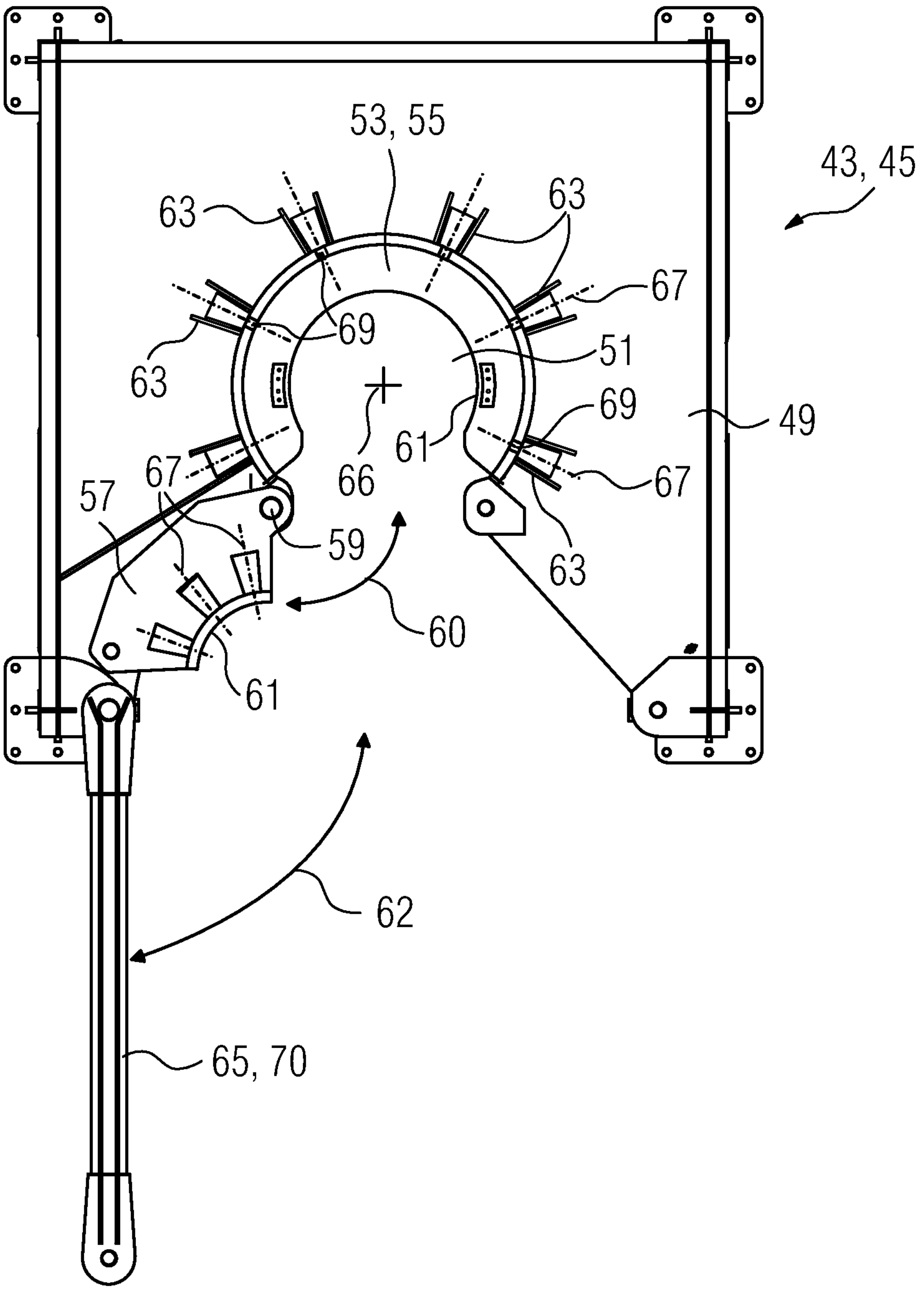
FIG. 3 shows a top view of the securing device, with the receptacle opened.
Figure 4:
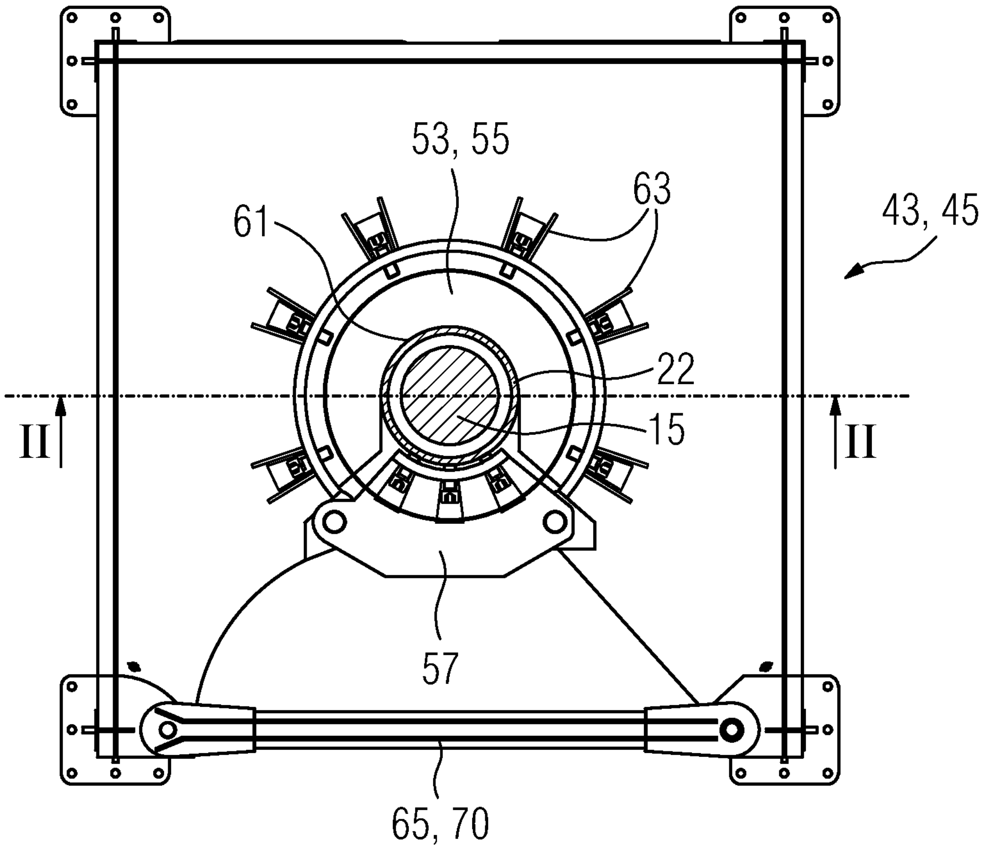
FIG. 4 shows a top view of the securing device, with the rotor introduced.

FIGS. 3 and 4 show a top view of the platform 49 of the securing device 45, FIG. 3 showing the platform 49 opened for receiving the rotor 13, and FIG. 4 showing the closed platform 49, with the centrally arranged tie rod 15 and front hollow shaft 22, according to the sectional view IV-IV of FIG. 2. In the platform 49 of the securing device 45, a centrally arranged orifice 51 is provided, in which an axial section of the hollow shaft 22 can be introduced. The orifice 51 is surrounded by a segmented ring 53, the first segment 55 of which comprises a segment arc of approximately 270° and the second segment 57 of which comprises a segment arc of approximately 90°. The second ring segment 57 is pivotable with respect to the first ring segment 55 about an axis of rotation 59, thus serving for the simple and rapid closing and opening of the ring 53 (cf. FIG. 4). The two segments 55, 57 have in each case an inwardly directed supporting surface 61 which can be brought to bear in each case against a section of the surface area of the rotor 13 or of the tie rod 15.

The ring 53 lies in a plane parallel to the horizontal plane 47, that is to say parallel to the foundation 29, and, by means of an auxiliary device carrying said ring, can be displaced within this plane for the vertical orientation of the rotor 13. The auxiliary device comprises, for example, a plurality of screw connections 63 fastened to the platform 49. Each of these screw connections 63 has a screw axis 67 which likewise lies in the plane parallel to the horizontal plane 47. With the ring 53 closed, the screw connections 63 are arranged in a radiating manner, so that their screw axes 67 meet at a virtual center 66. Instead of the screw connections 63, a hydraulic arrangement with a movable piston rod may also be provided in each case, in order, in turn, to support the ring 53 laterally and at the same time orient the rotor 13 (or else the tie rod 15) with respect to the turning block 27 in such a way that the rotor 13 can be displaced from an approximately perpendicular orientation to a vertical orientation.

Instead of the screw connection or instead of hydraulic cylinders, the ring 53 may also be mounted in a double-nested eccentric, so that the orifice 51 can be oriented, as desired, with respect to the axis 35 of the turning block 27.

The ring 53, too, is, overall, merely optional. It is also possible, for example, that the lateral support of the rotor 13 is carried out directly by the screw connections 63 or directly by the piston rods of the hydraulic cylinders. The supporting surfaces 61 would then be arranged at the inwardly projecting free ends 69 of the screw connections 63 or at the inwardly projecting free ends of the piston rods of the hydraulic cylinders, which ends would then be capable of being brought to bear directly against the surface area of the rotor 13.

So that the rotor 13 can be pivoted into the orifice 51 when its turbine-side end 39 is being raised, the ring 53 and the platform 49 must previously be opened. For this purpose, there is provision for the second segment 57 of the ring 53 to be pivotable about the axis of rotation 59 according to the arrow 60 from a closed position into an open position (illustrated). In the same way, the struts 65, illustrated in the bottom in FIG. 3, and the railings 70 of the work stage are swung away from the platform 49 according to the arrow 62, so that, overall, the receptacle is opened.

FIG. 4 shows a top view of the securing device 45 with the approximately completely closed ring 53. The ring 53 surrounds the hollow shaft 22 so that the supporting surfaces 61 bear against the surface area of the hollow shaft 22. The ring 53 is displaceable in the plane parallel to the foundation 29 via the individual screw connections 63, so that the center of the ring 53 and therefore the center of the tie rod 15 can be displaced slightly with respect to the turning block 27 and therefore with respect to the central rotor support point, in order to bring the rotor 13 into a vertical orientation.

In the context of the invention, the rotor 13 to be oriented vertically may, on the one hand, comprise only the tie rod 15 which is secured against tipping over by the supporting surfaces 61. On the other hand, the rotor 13 may also be understood to mean a tie rod 15 which is fully equipped with rotor disks 19, 21 and is supported in a similar way.

For an especially simple slipping of the rotor disks 19, 21 onto and off the tie rod 15, in which a possibly component-damaging contact between the rotor disks 19, 21 and the tie rod 15 is to be avoided during the lowering or raising of the rotor disks 19, 21, overall an approximately perpendicularly set-up rotor 13 or tie rod 15 may be oriented into the vertical in that, during orientation, the bearing surfaces 61 on which the rotor 13 or tie rod 15 is supported are displaced such that this comes to stand perpendicularly to the horizontal plane.

The invention claimed is:

1. A securing device for securing a turbomachine rotor set up transversely with respect to a horizontal plane against tipping over, comprising:

a supporting surface by which the rotor set up transversely to the horizontal plane is supported laterally by the securing device, wherein, for a vertical orientation of the rotor, the supporting surface against which the approximately perpendicularly set-up rotor bears during orientation is displaced slightly parallel to the horizontal plane in order to adjust the horizontal displacement of the rotor.

2. The securing device as claimed in claim 1, further comprising:

a ring composed of at least two ring segments, the supporting surface being arranged on the ring.

3. The securing device as claimed in claim 2, wherein one of the two ring segments is fastened so as to be pivotable with respect to the other ring segment.

4. The securing device as claimed in claims 3, further comprising:

a plurality of screw connections or a plurality of hydraulic cylinders, which extend parallel to the horizontal plane, and which have elements moveable parallel to the horizontal plane for displacing the supporting surface.

5. The securing device as claimed in claim 4, wherein the screw connections or hydraulic cylinders are arranged in a radiating manner about a virtual center.

6. The securing device as claimed in claims 2, further comprising:

a plurality of screw connections or a plurality of hydraulic cylinders, which extend parallel to the horizontal plane, and which have elements moveable parallel to the horizontal plane for displacing the supporting surface.

7. The securing device as claimed in claim 6, wherein the screw connections or hydraulic cylinders are arranged in a radiating manner about a virtual center.

8. The securing device as claimed in claim 2, further comprising:

an eccentric disk providing the supporting surface.

9. The securing device as claimed in claim 2, wherein the securing device is fastened on a foundation and comprises a platform jacked up on the foundation by a plurality of stays and struts.

10. The securing device as claimed in claim 9, wherein the supporting surface is provided at the height of the platform.

11. The securing device as claimed in claims 1, further comprising:

a plurality of screw connections or a plurality of hydraulic cylinders, which extend parallel to the horizontal plane, and which have elements moveable parallel to the horizontal plane for displacing the supporting surface.

12. The securing device as claimed in claim 11, wherein the screw connections or hydraulic cylinders are arranged in a radiating manner about a virtual center.

13. The securing device as claimed in claim 11, further comprising:

an eccentric disk providing the supporting surface.

14. The securing device as claimed in claim 11, wherein the securing device is fastened on a foundation and comprises a platform jacked up on the foundation by a plurality of stays and struts.

15. The securing device as claimed in claim 14, wherein the supporting surface is provided at the height of the platform.

16. The securing device as claimed in claim 1, further comprising:

an eccentric disk providing the supporting surface.

17. The securing device as claimed in claim 1, wherein the securing device is fastened on a foundation and comprises a platform jacked up on the foundation by a plurality of stays and struts.

18. The securing device as claimed in claim 17, wherein the supporting surface is provided at the height of the platform.

* * * * *